(No Model.)

J. GRAVES & A. W. PARTRICK.
COMBINED MEASURE AND WEIGHING SCALE.

No. 244,449.

Patented July 19, 1881.

Witnesses:
W. C. McArthur,
M. C. Cowles.

Inventors
John Graves,
Alfred W. Partrick.
Per Chas. H. Fowler,
Attorney.

UNITED STATES PATENT OFFICE.

JOHN GRAVES, OF EAST ORANGE, AND ALFRED W. PARTRICK, OF NEWARK, NEW JERSEY.

COMBINED MEASURE AND WEIGHING-SCALE.

SPECIFICATION forming part of Letters Patent No. 244,449, dated July 19, 1881.

Application filed January 3, 1881. (No model.)

*To all whom it may concern:*

Be it known that we, JOHN GRAVES and ALFRED W. PARTRICK, citizens of the United States, residing at East Orange and Newark, in the county of Essex and State of New Jersey, have invented certain new and useful Improvements in Combined Scale and Measure; and we do hereby declare that the following is a full, clear, and exact description of the same, reference being had to the annexed drawings, making a part of this specification, and to the letters and figures of reference marked thereon.

Figure 1:
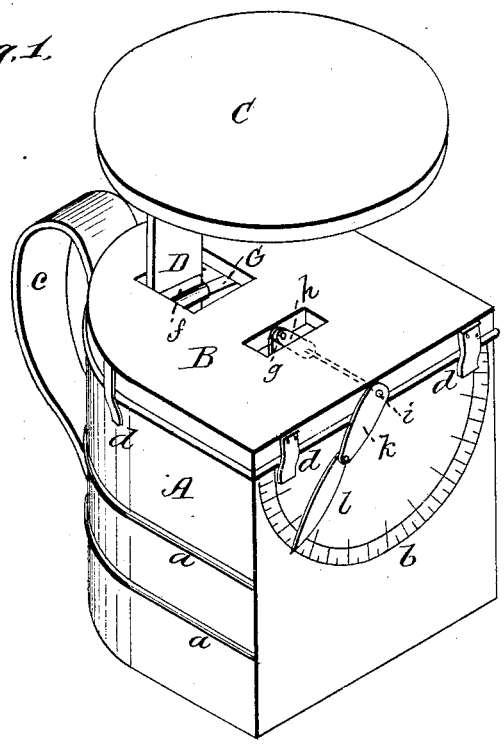
Figure 2:
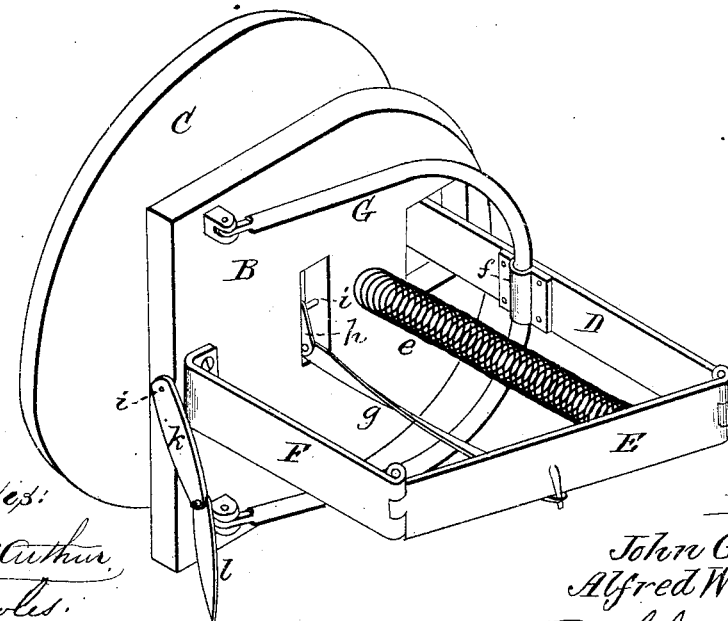

Figure 1 of the drawings is a perspective view of our invention, showing the weighing-scales and measuring-vessel connected together; and Fig. 2 is a perspective view of the weighing-scales detached from the measuring-vessel.

The present invention has relation to that class of devices in which is combined a weighing-scales with a measuring-vessel.

The object of the invention is to so combine a weighing-scales with a measuring-vessel as to admit of the two being detached from each other and separated, whereby the measuring-vessel can be used for measuring liquids or solids independent of the scales, and when connected together the vessel forming a base or support for the scales, thereby obtaining a very convenient and useful article for household purposes.

A further object of the invention is to provide means whereby the tare of the scales is taken up, also simplifying the several details of construction.

These several objects we attain by the construction shown in the accompanying drawings and hereinafter described.

In the drawings, A represents the measuring-vessel, preferably of sheet metal, and of any suitable form and capacity to measure one quart, pint, or fraction of a pint by beads *a* or other suitable marks upon the exterior of the vessel. The front of the vessel A is preferably flat, and has a semicircular line of graduation-marks, *b*, from a pound to a fraction thereof, said vessel being also provided with a suitable handle, *c*, so that when used for measuring solids, such as flour or meal, it can be conveniently handled to dip into the barrel, bucket, or other receptacle containing it.

B is the plate to which the several operating parts of the weighing-scales are connected, and is in form and size to correspond with the form and size of the vessel A in cross-section. This plate B is held in place over the top of the vessel by spring-clips *d* or other convenient means that will admit of the plate being readily detached and separated from the vessel A.

The scale-pan C is mounted in the usual manner upon the upper end of a standard, D, said standard passing down through an opening in the plate B, and has hinged thereto, or to the lower end of the standard, a horizontal arm, E, the opposite end of the arm being hinged to an arm, F, rigidly connected to the under side of the plate B.

Between the plate B and horizontal arm E is located a coiled spring, *e*, the ends thereof being connected to the under side of the plate and upper side of the horizontal arm.

A wire yoke, G, passes through a loop, *f*, on the standard D, and its ends are pivoted to the under side of the plate B, this yoke guiding and keeping vertical the standard and preventing any undue strain on the hinged arm E and spring *e*.

Connected to the arm E is a vertical rod, *g*, which passes up through an elongated opening in the plate B, and has pivoted to its upper end a link, *h*, which is, in turn, rigidly connected to the inner end of a horizontal rod, *i*. To the outer end of this rod *i* is rigidly connected a hand, *k*, to the end of which is pivoted the pointer *l*.

In actual practice the various hinged connections of the scales will be constructed with knife-edges to avoid any great degree of friction and render the scales more accurate, as is common with this class of scales.

Previous to weighing the hand and pointer are on the same line, as illustrated in Fig. 1. Now, when the dish or other receptacle is placed on the platform C and its weight ascertained by the pointer *l*, all that is necessary is to bring the pivoted pointer to zero upon the graduation-marks or dial-plate, thereby taking up the tare, after which the weighing of the article may be proceeded with, thereby rendering the scale perfectly reliable and providing a very simple means of regulating or taking up the tare.

When the measuring-vessel A is required for use the plate B with its weighing mechanism is simply lifted off the vessel, which leaves the latter free to be used for measuring either liquids or solids, as required.

When the weighing-scales and measuring-vessel are together the latter incloses the operating parts of the scale, forming a base or support for the same, making altogether a very neat and compact, as well as convenient, article for household uses, especially in the culinary department, where measuring and weighing are frequently found necessary.

We do not desire to be understood as confining our invention, when the two devices are taken together, to any special construction of weighing-scale or measuring-vessel, the special feature of the invention being in so combining the two that they may be readily detached and separated from each other to admit of the measuring-vessel being used independent of the weighing-scale. It is, however, necessary that the measuring-vessel should have some form of marks to designate quarts, pints, or fractions thereof, also graduation-marks or a dial-plate, to act in conjunction with the weighing-scales when the same is connected to the vessel; otherwise the exact construction of the various parts as shown is not deemed essential to the successful operation of our invention.

Having now fully described our invention, what we claim as new, and desire to secure by Letters Patent, is—

1. A weighing-scale having a pivoted or jointed pointer for the purpose of taking up or regulating the tare, substantially as and for the purpose specified.

2. The measuring-vessel A, having beads $a$ or other form of marks to designate quarts and fractions thereof, and graduation-marks or dial-plate to indicate pounds and fractions, in combination with a suitable weighing-scale resting upon the top of said measuring-vessel and detachably connected thereto, substantially as and for the purpose described.

3. The measuring-vessel A, having graduation-marks $b$ or dial-plate, in combination with the weighing-scales, constructed substantially as described, with the pivoted pointer $l$ and finger $k$, and plate B, having spring-clips $d$ or other suitable means for detachably connecting the scales to the measuring-vessel, substantially as and for the purpose specified.

In testimony that we claim the above we have hereunto subscribed our names in the presence of two witnesses.

JOHN GRAVES.
ALFRED W. PARTRICK.

Witnesses:
CHARLES T. GLEN,
JOHN H. MEEKER, Jr.